United States Patent [19]

Brester et al.

[11] 4,408,508

[45] Oct. 11, 1983

[54] CUTTING TOOL HAVING CIRCULAR BLADE MOUNTED ON A PIVOTED LEVER

[75] Inventors: Robert R. Brester, New Berlin; Thomas L. Roberts, Mukwonago, both of Wis.

[73] Assignee: Velvac, Inc., New Berlin, Wis.

[21] Appl. No.: 337,573

[22] Filed: Jan. 7, 1982

[51] Int. Cl.³ .................... B23D 21/00; B23D 17/00
[52] U.S. Cl. .................. 83/397; 83/467 R; 83/608
[58] Field of Search ............... 83/607, 608, 609, 397, 83/398, 467, 468, 544–546

[56] References Cited

U.S. PATENT DOCUMENTS 2,263,231 11/1941 Zimmerman ............... 83/608 X
2,263,466 11/1941 McCarthy ................. 83/607 X
4,262,570 4/1981 Doyle ..................... 83/607 X

*Primary Examiner*—James M. Meister
*Attorney, Agent, or Firm*—Bayard H. Michael

[57] ABSTRACT

The cutting tool has a circular blade having a center hole and a plurality of pivot holes spaced apart on a common radius with a handle fixed to the center hole and one of said pivot holes. A pivot shaft extends between spaced side plates and the blade is mounted on said pivot shaft. Each side plate has a throat and an anvil welded to each side plate at the rear lower corner of the throat. Each anvil has a bed plate and a back plate on which and against which the material to be cut is positioned. A blade guard depends from the handle and is contoured to lie close to the adjacent circumference of the blade and extend across the throat when the handle is in its lowermost position.

7 Claims, 6 Drawing Figures

CUTTING TOOL HAVING CIRCULAR BLADE MOUNTED ON A PIVOTED LEVER

BACKGROUND OF THE INVENTION

Cutting nylon tubing and reinforced rubber hose (other than steel reinforced) is not as simple as it would appear at first blush. These materials are flexible and it is quite difficult to get a clean, square cut across the tube since the tube tends to flatten and squirm as it is being cut leading to irregular cuts. Multi-conductor electrical cable is quite difficult to cut because the great number of strands and cables give considerable resistance to the cutting tool. The cable is designed to be flexible and hence will tend to squirm and lead to irregular cuts. Indeed many multi-strand cables end up being cut by hand with a combination of knife and diagonal cutters with the end result that the cut end can be described as ragged at best.

To our knowledge there has been no cutter capable of cutting both tubing, hose and multi-conductor electrical cable. The tool should be simple to operate and maintain and should be reasonably priced so as to be affordable in automotive and trucking service facilities, supply houses, and in industry.

SUMMARY OF THE INVENTION

The object of this invention is to provide a cutting tool capable of cutting flexible hose, nylon tubing, reinforced hose, and multi-conductor electrical cable and to do so with clean, square cut. This object is accomplished by providing a tool which can be bench mounted or mounted on its own wood base and which incorporates a circular blade between two side plates which prevent access to the blade except in the throat section of the plates. An anvil is provided in the throat and has an upstanding backstop to position the material being cut square to the blade and to prevent distortion of the material being cut.

The blade in the illustrated embodiment is 3/32" thick D-6 high carbon, high chrome alloy giving the blade great strength and wear resistance. The blade is thicker than prior cutting blades. Normally thickness is not a virtue since slicing through a flexible tube with a thick blade tends to distort the tube. The present blade, however, has both sides beveled to an included angle of 9½° to 10° and hence is very sharp and well tapered. The blade slices through the material cleanly and with both edges being beveled does not develop a lateral force tending to shove the material being cut to one side. The thick blade successfully withstands forces tending to distort the blade or to cause the blade to wander as it slices through the material.

The handle which is attached to the circular blade incorporates an integral stop which, when the tool is not in use, rests against a stop positioned between the side plates of the tool and blocks access to the cutting edge through the throat. Thus, when the tool is not in use, the blade is protected and danger to people working in the vicinity is minimized. This is very important since the blade is so sharp that nasty cuts would result if the blade is touched accidentally.

DETAILED DESCRIPTION OF THE DRAWINGS

Figure 1:
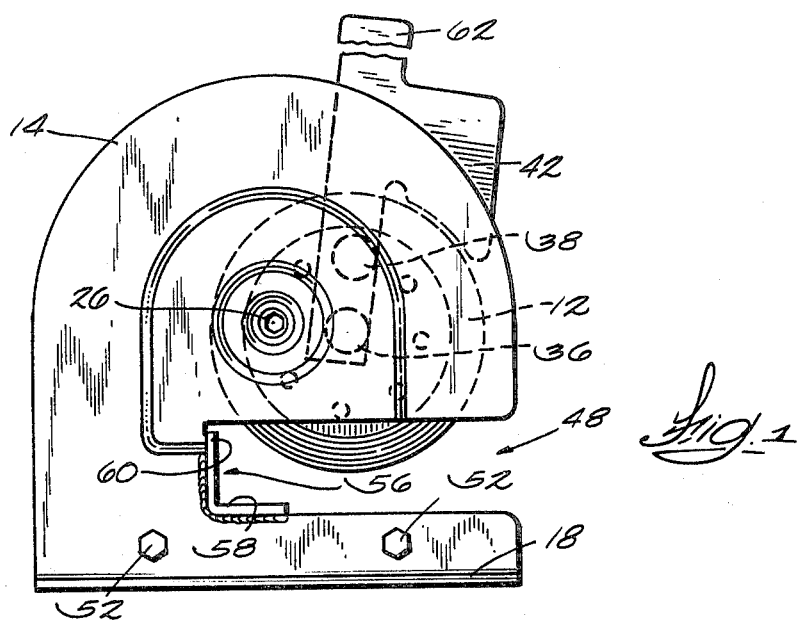
FIG. 1 is a side elevation of the tool with the blade raised.

The cutting tool has a circular blade 12 mounted between spaced plates 14, 16. Each plate has a bottom flange 18, 20 permitting the tool to be bolted to a workbench or to a separate piece of wood where portability or storage is required. Circular blade 12 is provided with eight holes 22 spaced at 45° with respect to center hole 24 on a common radius. One of these holes is selected to serve as the pivot for the blade. The blade is pivotly mounted on bolt 26 which has a ground portion 28 on which blade 12 is pivotly mounted. The fit is a precision fit to obviate blade wobble. Spacers 30, 30 are also mounted on bolt 26 on each side of the blade to center the blade between side plates 14, 16. A washer is provided on each side of plates 14, 16 and a self-locking nut 32 completes the assembly of the blade between the plates. Prior to assembly handle 34 is mounted on blade 12.

Figure 2:
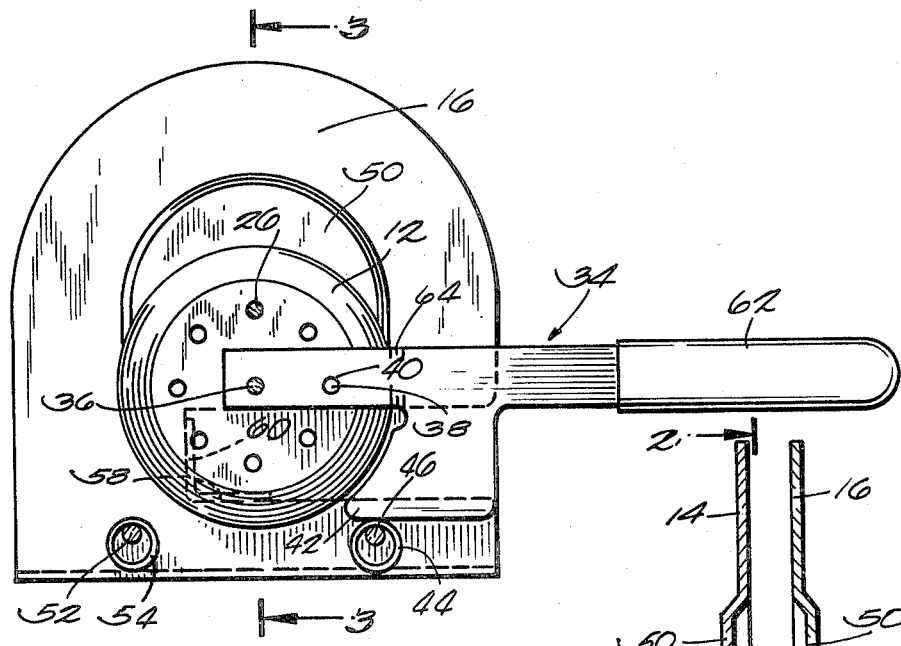
FIG. 2 is a section taken on line 2—2 of FIG. 3 to, in effect, remove the near side plate to show further details of the mounting of the handle and to show the details of the limit stop arrangement protecting against access to the blade when the handle is in its lower position.
Figure 3:
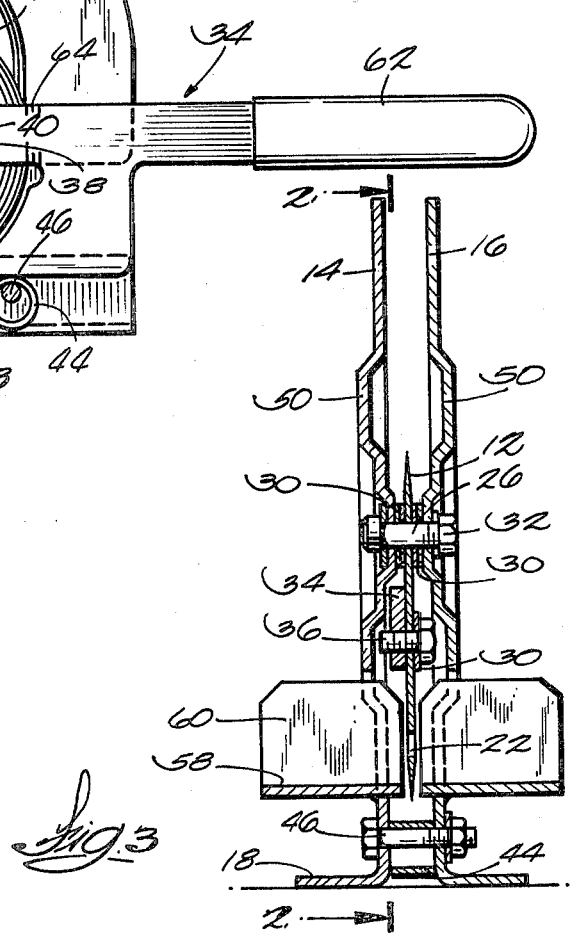
FIG. 3 is a vertical section on line 3—3 in FIG. 2 except that both side plates are shown.
Figure 4:
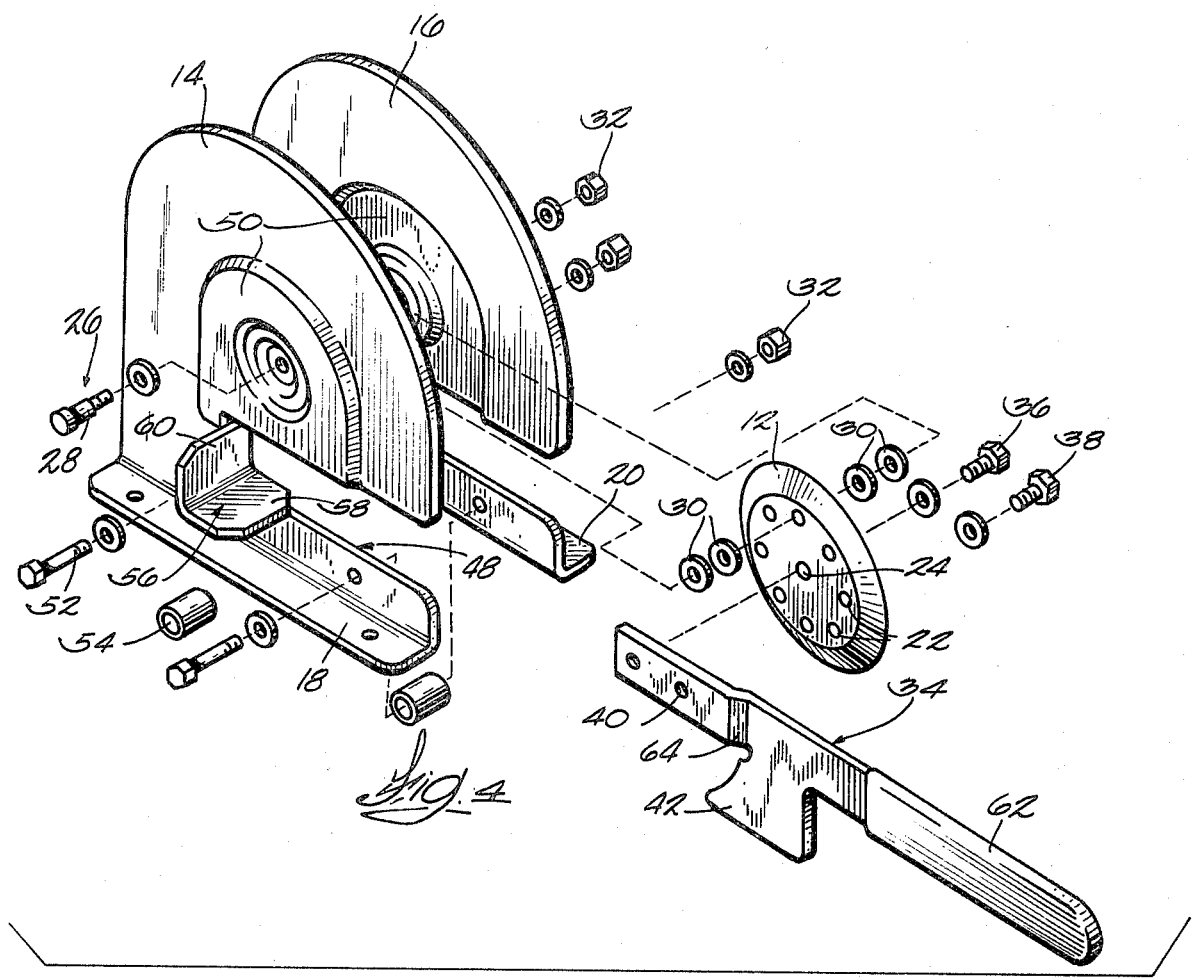
FIG. 4 is an exploded perspective view of the cutter to illustrate the manner in which it is assembled.

Bolt 36 passes through center hole 24 of the blade 12 and threads into the left end of the handle 34 while bolt 38 passes through one of the spaced holes 22 and threads into hole 40 of handle 34 so that the handle will be horizontally disposed when in the down position shown in FIG. 2. In this position the depending blade guard and limit stop 42 rests against spacer 44 through which bolt 46 passes to interconnect side plates 14, 16. In the position shown in FIG. 2, it will be noted the blade guard prevents access to the circular blade which would otherwise be exposed in the throat section at the throat 48.

It will be noted that with this arrangement the entire circumference of the circular blade can be utilized. Thus, when one section of the blade has become nicked or dulled, the blade pivot can be moved to pass through the next adjacent hole 22 and the handle correspondingly adjusted to bring a new section of the blade circumference into operative position. It will be apparent that side plates 14, 16 are dimensioned so the circular blade will lie inside of the outer dimensions of the side plates in any position in which the blade can be moved, thus preventing accidental contact with the sharp edge of the blade. Side plates 14, 16 have a formed raised section 50 with an inner depressed portion. This adds strength to the side plates to make them quite rigid. Further rigidity is added to the assembly by interconnecting the rear portion of the side plates by means of bolt 52 with spacer 54 between the plates. This rigid construction coupled with the precision bearing shaft 28 insures that the blade does not wobble or wander as it passes through the material being cut.

The material to be cut, whether it be tubing, hose or multi-conductor electrical cable, is placed on the anvil support members 56 welded to the plates at the rear corner of the throat 48. Each anvil 56 has a flat bed 58 and an upstanding backing plate 60. The anvils do not meet since the space between the plates must be left open for passage of the blade. The material to be cut is placed on the anvils while the handle is held in an elevated position by an operator grasping the right end of the handle which is provided with a suitable plastic covering 62. Then, as the handle is pulled downwardly to pivot the blade about the pivot shaft 26 the blade will have a slicing action on the material positioned on the anvil and will exert a rearward and downward force thus holding the work firmly in position against the anvil during the cutting action. With the anvil positioned to the rear of the pivot point or the blade the action of the blade as it progresses through the material being cut will have a slicing action. This improves the quality of cut as compared to cutters which attempt to simply force the blade through the material. The length of the handle can be adjusted to obtain the mechanical advantage desired. In the present arrangement with a six inch diameter blade it has been found to be quite satisfactory to use a 12" handle.

It will be noted that the handle 62 has a slight offset 64 bringing the grip end of the handle into alignment with the blade. This optimizes the position of the blade guard/limit stop 42 with respect to the blade and the force applied to the handle is centered with respect to the blade to eliminate tendency to cant the blade on the pivot shaft. This insures that the blade runs true and square to the work as it passes through the work.

The blade in this instance is 3/32" thick which is extraordinarily thick for cutting blades. Both edges of the blade are ground to a very small angle i.e. the included angle is approximately 9 $\frac{1}{2}$°. This is an extremely sharp angle for a cutter. With the high-carbon, high-chrome D-6 alloy there is enough strength in the 3/32" blade to perform admirably. Normally a thick blade is considered undesireable due to the spreading action of the blade which causes irregular and inferior cuts. With the extremely sharp beveled blade edge, however, the thick blade can be utilized without in any way impairing the quality of the cut. The double grind cannot, however, be too gradual since the edge of the blade would then be so thin as to be subject to severe damage particularly when cutting multi-conductor electrical cable such as, for example, the cable shown in FIG. 5 and 6.

Figure 5:
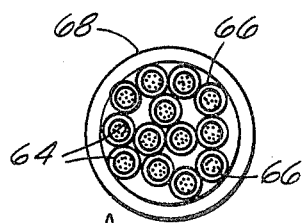
FIGS. 5 and 6 are simply representative examples of a type of multi-conductor cable which can be successfully cut with the present tool.
Figure 6:
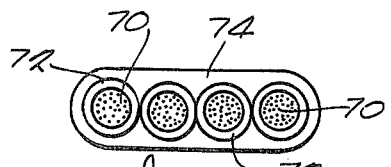

In FIG. 5 various multi-strand conductors 64 individually insulated with color coded sleeves 66 are enclosed in an outer flexible insulator 68. Also with this type of arrangement the interstices between sleeves 66 are filled with cotton threads which are extremely troublesome in cutting of such cable. The present cutting tool can slice through this cable with a clean, square cut. It can also slice through cables such as shown in FIG. 6 where the multi-strand wire 70 is again insulated by color coded sleeves 72 and the entire arrangement is encased in the plastic jacket 74.

Going back to the matter of the included angle between the beveled faces of the blade, the present design has an included angle of approximately 9$\frac{1}{2}$° to 10°. It is felt that there may be a useful range of say 8° to 11$\frac{1}{2}$° with less than 8° getting the blade too weak structurally resulting in a short service life. An included angle over 11$\frac{1}{2}$° becomes blunt as to spread the material too close to the cut so the cut becomes uneven.

A circular type blade is not new in cutting tools. Such blades have been used in the past but were generally thinner. The prior use of the circular blade was in a tool having only one side plate with the blade being mounted on a stub shaft which served as the pivot. Thus, the pivot was not as rigid as the present design and the blade could wander. The operator was not protected from accidental contact with the blade. In the present design with the spaced plates 14, 16, the blade always lies between the plates and within the outer dimensions of the plate so that accidental contact with the blade is precluded. The limit stop/blade guard 42 prevents accidental contact with the blade when the handle is in the down position. Of course, during the actual cutting operation extreme care has to be exercised since there is no practical way to guard against contact with the blade.

We claim:

1. In a cutting tool of the type having a circular blade having a center hole and a plurality of pivot holes spaced apart on a common radius and a handle fixed to the center hole and one of said pivot holes the improvement comprising,
    spaced side plates,
    a pivot shaft extending between the side plates,
    said blade being mounted on said pivot shaft,
    a throat in each side plate,
    an anvil welded to each side plate at the rear lower corner of the throat and having a bed plate and a back plate on which and against which the material to be cut is positioned,
    a blade guard depending from the handle and contoured to lie close to the adjacent circumference of the blade and extend across that throat when the handle is in its lowermost position.

2. A cutting tool according to claim 1 in which said blade guard engages a fixed stop when said handle is in its lowermost position.

3. A cutting tool according to claim 2 in which the blade has both sides beveled in the proximity of the blade circumference to provide a sharp edge the included angle of the beveled edges being between 8° and 11$\frac{1}{2}$°.

4. A cutting tool according to claim 2 in which the blade has both sides beveled in the proximity of the blade circumference to provide a sharp edge, the included angle of the beveled edges being about 9$\frac{1}{2}$° or 10°.

5. A cutting tool according to claim 1 in which the blade has a precision fit on the pivot shaft to minimize blade wobble, and spacers between the blade and the adjacent side plate surface to center and stablize the blade.

6. A cutting tool according to claim 5 including means interconnecting the lower portions of the side plates with spacers therebetween, said handle including a depending blade guard lying closely adjacent the circumference of the blade and engagable with a fixed stop when the handle is in its lowermost position to thereby close the throat and prevent accidental contact with the blade.

7. A cutting tool according to claim 1 in which the side plates are dimensioned so the rotary blade always lies between and does not extend beyond the side plates in any position of the blade.

* * * * *